Jan. 17, 1956 — B. P. NUNN — 2,731,050
MULTIPLE SPINDLE DRILL
Filed Nov. 27, 1953 — 2 Sheets-Sheet 1

Barney P. Nunn
INVENTOR.

Jan. 17, 1956     B. P. NUNN     2,731,050
MULTIPLE SPINDLE DRILL
Filed Nov. 27, 1953     2 Sheets-Sheet 2
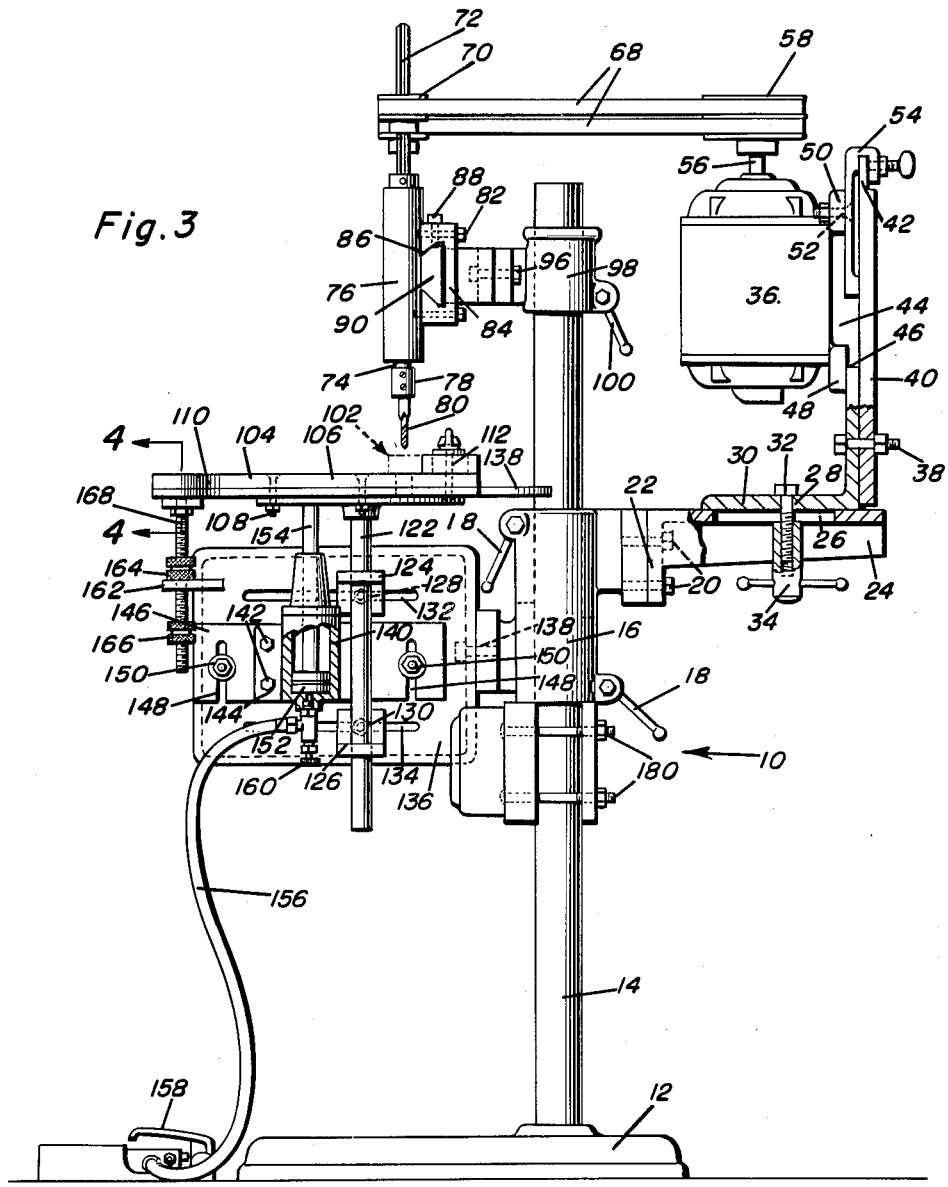
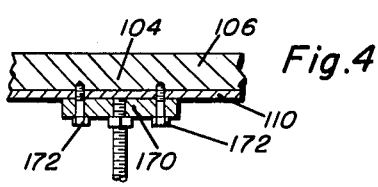
Barney P. Nunn
INVENTOR.

United States Patent Office 2,731,050
Patented Jan. 17, 1956

2,731,050

MULTIPLE SPINDLE DRILL

Barney P. Nunn, Marietta, Ga.

Application November 27, 1953, Serial No. 394,721

6 Claims. (Cl. 144—110)

This invention relates to the class of machine tools and more particularly to a novel apparatus having a plurality of spindles for concurrently performing drilling operations and the like.

The primary object of this invention resides in the provision of an apparatus adapted to provide a considerable saving in the expenditure of time and effort necessary to perform desired operations on a work-piece such as may be used in furniture or the like by providing a battery of rotating spindles for performing the indicated operations.

The construction of this invention features a novel arrangement of parts whereby a plurality of spindle housings may be adjustably supported above a work-table in a desired spaced relationship. Another novel arrangement of parts includes means for adjustably mounting the motor for driving the spindles journalled in the spindle housings in such a manner that no matter what the selected spacing of the spindle housings the motor may be suitably adjusted so as to keep the endless drive belts taut.

Another feature of the multiple spindle drill is the means for raising and lowering the work-table in conjunction with the multiple spindles so that a work-piece may be properly aligned with the cutting tools attached to the spindles.

Still further objects and features of this invention reside in the provision of a multiple spindle drill that is comparatively simple in construction, easy to operate, accurate and efficient to use and which may be operated by a person with little training in the particular field so as to enable a comparatively great reduction in the cost of manufacture of articles produced and utilizing this machine.

These, together with the various ancillary objects and features of the invention which will become apparent as the following description proceeds, are attained by this multiple spindle drill, a preferred embodiment of which has been illustrated in the accompanying drawings, by way of example only, wherein:

Figure 3 is a side elevational view on an enlarged scale illustrating the relative arrangement of parts of the apparatus;

Figure 4 is a vertical sectional detail view as taken along the plane of line 4—4 in Figure 3.

Figure 1:
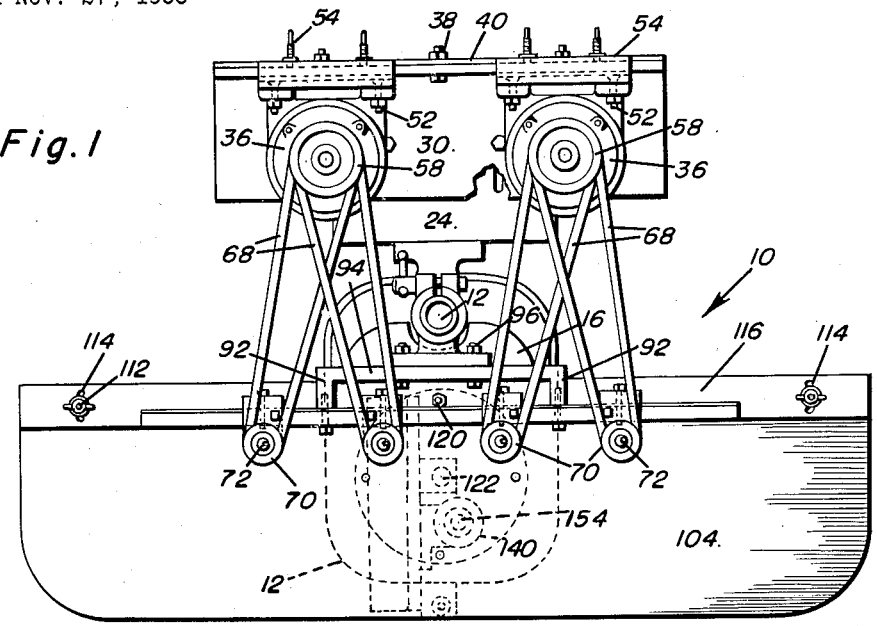
Figure 1 is a top plan view of the multiple spindle drill comprising the present invention.
Figure 2:
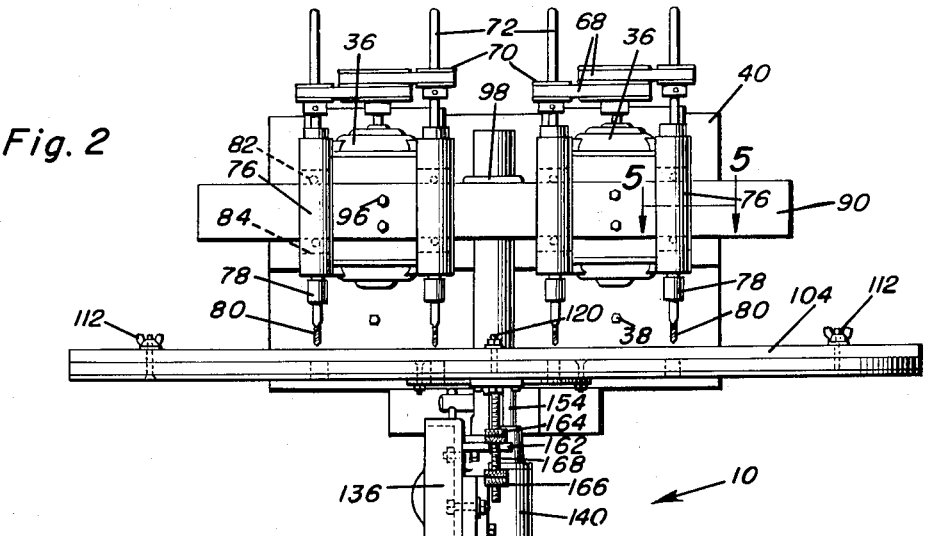
Figure 2 is a front elevational view of the machine.
Figure 5:
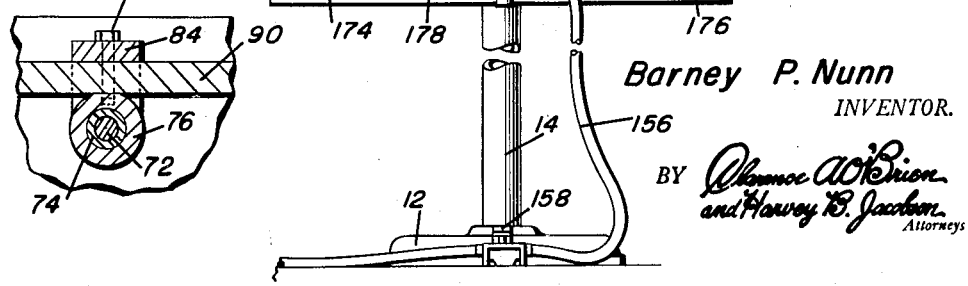
Figure 5 is a sectional detail view as taken along the plane of line 5—5 of Figure 2 illustrating the manner in which the spindle housings are attached to the mounting bar.

With continuing references to the accompanying drawings wherein like reference numerals designate similar parts throughout the various views, reference numeral 10 generally designates the multiple spindle drill comprising the present invention. This machine includes a base 12 to which a cylindrical vertically extending standard 14 is attached. Vertically adjustably secured on the standard 14 is a carriage 16, the carriage being adapted to be held in place by cam type clamping members 18.

Secured to the carriage 16 by means of bolts as at 20 is the flange 22 of a support member 24 provided with a slot 26 therein. Extending through an aperture 28 in an L-shaped plate 30 is a bolt 32 which by means of a handled clamp member 34 is used to adjustably secure the L-shaped plate 30 on the support member 24. The L-shaped member and the parts attached thereto are utilized for mounting a selected number of electric motors 36 in an adjustable manner.

Secured to the L-shaped plate 30 by means of bolts as at 38 is a back plate 40 having a portion of reduced cross sectional area as at 42 at the upper edge thereof.

Each of the motors 36 have base plates 44 attached thereto the lower edges 46 of which are adapted to abut against the upper edge of the L-shaped plate 30. The motors 36 are further provided with legs 48 adapted to overlie the joint formed by the abutting edges of the base plates 44 and the L-shaped plate 30 and other legs 50 are also provided through which fasteners as at 52 extend which are used to secure clamp members 54 to the motors 36. The clamp members 54 are secured over the portion 42 of the backing plate 40 and lockingly hold the motors 36 in an adjusted position. Since the clamps 54 may be loosened and then the motors 34 slid along the backing plate 40, great flexibility of adjustment of the position of the motors 36 may be had since the motors may be moved in or out utilizing the slot 26 and the bolt 32 and may be moved to right or left utilizing the clamps 54 and the backing plate 40 or may be raised and lowered using the clamping members 18 for raising and lowering the carriage 16. The motor mounting arrangements including the backing plate 40 are made adjustable since different size motors may be required and different size spindles 74 may be utilized in this machine. Further, this relative adjustment of parts permit not only different size spindles and motors to be utilized but permit various size work pieces to be operated upon.

The motors 36 drive shafts 56 on which pairs of pulleys 58 are mounted, the pulleys 58 being connected by endless belts 60 to pulleys 70 mounted on keyed shafts 72 forming a part of the spindles 74 journalled in spindle housings 76 and having chucks 78 to which cutting tools 80 are detachably seated.

The spindle housings 76 have attached thereto by means of bolts or other suitable fasteners 82 slides 84 provided with dovetailed shaped recesses 86 therein. A set screw or other locking means 88 extends through each of the slides 84 and is adapted to lock the slides 84 and hence each of the spindles 76 in an adjusted position on a dovetailed-shape bar 90 which is carried by the legs 92 of a substantially U-shaped mounting plate 94 bolted as at 96 or otherwise secured to a collar member 98 which is adjustably secured on the standard 14 by means of a cam type clamp 100 or the like.

Inasmuch as the set screw 88 may be readily released and the spindles slid along the mounting bar 90 a great degree of flexibility of adjustment of the spindle housings 76 and hence of the spindles 74 is possible.

The cutting tools 80 are adapted to engage a work piece as at 102 mounted on a table 104, the table including a preferably wooden top 106 which is bolted or otherwise secured as at 108 to a metallic plate 110. Adjustment bolts 112 extend upwardly through the table 104 and are adapted to extend through arcuate slots 114 mounted in the ends of a guide 116 extending the length of the table 104 and adapted to be utilized in aligning the work piece 102 beneath the spindles 74. It is to be noted that the guide 116 may be pivoted about the bolt 120 as can be seen in Figure 1.

The table 104 is carried by a vertically extending rod 122 which extends through suitable apertures in guide brackets 124 and 126 which are adjustably secured by means of bolts 128 and 130 extending through slots 132 and 134 formed in a member 136 attached as by bolts 138 to the carriage 16. Utilizing the guide like brackets 124 and 126, the position of the table 104 may be adjusted. It is to be noted that the plate 110 is provided with a portion as at 138 which is adapted to loosely embrace the standard 14.

Means are provided for raising and lowering the table 104 and these include a cylinder 140 which is secured as by bolts or other fasteners 142 which extend through a flange 144 attached to the cylinder 140 to a mounting plate 146 having slots 148 therein which in conjunction with fasteners 150 are utilized for the vertical adjustment of the cylinder 140. The cylinder has a piston 152 therein and a piston rod 154 extends outside of the cylinder 140 and is adapted to engage the table 104 to raise and lower the table upon actuation of the piston through a pneumatic line 156 connected through a switch control mechanism 158 and adapted to be actuated by the foot of the user to a suitable source of pneumatic pressure, not shown. A needle valve 160 is provided for controlling the flow of fluid to the cylinder 140. Hence upon compression of the switch 156 the piston rod 154 will urge the table 104 upwardly and upon release of the switch 158 gravity will cause the table 104 to return to a lowered position.

Secured to the member 136 is a bifurcated stop 162 which is adapted to engage an upper set of threaded stop members 164 and a lower set of threaded stop members 166 mounted on a threaded rod 168 which is threadedly secured in a plate 170 attached by means of bolts as at 172 to the plate 110 of the table 104. These stops 164 and 166 are adapted to limit upper and lower movements of the member 136.

Mounted on the standard 14 are switch boxes 174 and 176 which are connected to the motors 36 by suitable electrical conductors. The switch boxes 174 and 176 are attached to an instrument board 178 which is clampingly secured by means of fasteners or bolts 180 to the standard 14.

Since from the foregoing the construction and advantages of this multiple drill are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A multiple drill having a base and a vertical standard rising from said base, a carriage adjustably secured on said standard, a work table carried by said carriage, means for raising and lowering said work table secured to said carriage, motor mounting means, a plurality of motors secured to said mounting means, a mounting bracket adjustably secured on said standard, a plurality of spindle housings carried by said bracket, spindles journaled through said housings, said motor mounting means being vertically adjustable with relation to said carriage, said motor mounting means vertically adjusting said motors relative to said carriage, and drive means connecting said motors with said spindles.

2. A multiple drill having a base and a vertical standard rising from said base, a carriage adjustably secured on said standard, a work table carried by said carriage, means for raising and lowering said work table secured to said carriage, motor mounting means, a plurality of motors secured to said mounting means, a mounting bracket adjustably secured on said standard, a plurality of spindle housings carried by said bracket, spindles journaled through said housings, said motor mounting means being vertically adjustable with relation to said carriage, said motor mounting means vertically adjusting said motors relative to said carriage, and drive means connecting said motors with said spindles, a bracket for securing a plurality of spindle housings to said standard comprising a collar member slidably received about said standard and adjustably secured thereto, a mounting plate of substantially U-shape secured to said collar member and having a pair of supporting arms, a dovetail shaped bar secured to said arms, and a plurality of slides having dovetail recesses therein, said slides engaging said bar with said bar being received in said recesses, said slides being secured to said spindle housings, spindles journalled through said housings, and drive means connecting said motors with said spindles.

3. In a multiple drill having a carriage adjustably mounted on a vertical standard, motor mounting means for supporting motors for driving a plurality of spindles comprising a substantially L-shaped plate adjustably secured to said carriage, a backing plate secured to said L-shaped plate, said motors having bases provided with legs, clamp means secured to the bases of said motors engaging said backing plate holding said motors with the bases of said motors resting on said L-shaped plate and with said legs overlying a portion of said L-shaped plate, said clamp means being slidable along said backing plate to adjust the position of said motors.

4. A multiple drill having a base and a vertical standard rising from said base, a carriage adjustably secured on said standard, a work table carried by said carriage, means for raising and lowering said work table secured to said carriage, motor mounting means, a plurality of motors secured to said mounting means, a mounting bracket adjustably secured on said standard, a plurality of spindle housings carried by said bracket, spindles journaled through said housings, said motor mounting means being vertically adjustable with relation to said carriage, said motor mounting means vertically adjusting said motors relative to said carriage, and drive means connecting said motors with said spindles, said motor mounting means comprising a substantially L-shaped plate adjustably secured to said carriage, a backing plate secured to said L-shaped plate, said motors having bases provided with legs, clamp means secured to the bases of said motors engaging said backing plate holding said motors with the bases of said motors resting on said L-shaped plate and with said legs overlying a portion of said L-shaped plate, said clamp means being slidable along said backing plate to adjust the position of said motors.

5. A multiple drill havng a base and a vertical standard rising from said base, a carriage adjustably secured on said standard, a work table carried by said carriage, means for raising and lowering said work table secured to said carriage, motor mounting means, a plurality of motors secured to said mounting means, a mounting bracket adjustably secured on said standard, a plurality of spindle housings carried by said bracket, spindles journaled through said housings, said motor mounting means being vertically adjustable with relation to said carriage, said motor mounting means vertically adjusting said motors relative to said carriage, and drive means connecting said motors with said spindles, a bracket for securing a plurality of spindle housings to said standard comprising a collar member slidably received about said standard and adjustably secured thereto, a mounting plate of substantially U-shape secured to said collar member and having a pair of supporting arms, a dovetail shaped bar secured to said arms, and a plurality of slides having dovetail recesses therein, said slides engaging said bar with said bar being received in said recesses, said slides being secured to said spindle housings, spindles journalled through said housings, and drive means connecting said motors with said spindles, said motor mounting means comprising a substantially L-shaped plate adjustably secured to said carriage, a backing plate secured to said L-shaped plate, said motors having bases provided with legs, clamp means secured to the bases of said motors engaging said backing plate holding said motors with the bases of said motors resting on said L-shaped plate and with said legs overlying a portion of said L-shaped plate, said clamp means being slidable along said backing plate to adjust the position of said motors.

6. A multiple drill having a base and a vertical standard rising from said base, a carriage adjustably secured on said standard, a work table carried by said carriage, means for raising and lowering said work table secured to said carriage, motor mounting means, a plurality of motors secured to said mounting means, a mounting bracket adjustably secured on said standard, a plurality of spindle housings carried by said bracket, spindles journaled through said housings, said motor mounting means being vertically adjustable with relation to said carriage, said motor mounting means vertically adjusting said motors relative to said carriage, and drive means connecting said motors with said spindles, said means for lowering said work table comprising a cylinder, a piston in said cylinder having a piston rod extending out of said cylinder and engaging said table, pneumatic means connected to said cylinder for actuating said piston, and means adjustably securing said cylinder to said carriage.

References Cited in the file of this patent

UNITED STATES PATENTS

| | | |
|---|---|---|
| 257,061 | Parry | Apr. 25, 1882 |
| 515,237 | Lavigne | Feb. 20, 1894 |
| 1,453,931 | Flick | May 1, 1923 |
| 1,766,115 | Einstein | June 24, 1930 |
| 1,834,956 | Lonie | Dec. 8, 1931 |
| 2,558,295 | Griswold | June 26, 1951 |
| 2,638,800 | Frushour | May 19, 1953 |
| 2,645,979 | Haesler | July 21, 1953 |